United States Patent Office 3,361,842
Patented Jan. 2, 1968

3,361,842
LIQUID COPOLYMERS OF ETHYLENE, ANOTHER ALPHA OLEFIN AND CARBOXYLIC ACIDS AND COMPOSITIONS THEREOF WITH POLYEPOXIDES
Douglas D. Applegath, Midland, Mich., and George A. Klumb and George E. Waples, Jr., Lake Jackson, Tex., assignors to The Dow Chemical Company, Midland, Mich., a corporation of Delaware
No Drawing. Filed Apr. 25, 1963, Ser. No. 275,486
17 Claims. (Cl. 260—837)

ABSTRACT OF THE DISCLOSURE

Low molecular weight liquid copolymers of ethylene and smaller amounts of alpha mono ethylenically unsaturated aliphatic olefins and ethylenically unsaturated carboxylic acids are blended with polyepoxides having a multiplicity of epoxide groups and a viscosity less than about $10^5$ centipoises at 200° F. to form pourable casting compositions which can be cured to high molecular weight solvent and water resistant flexible solid resins e.g. casting syrups for encapsulating electrical components and as binders for fillers in floor tile compositions. In an example, 100 g. of a copolymer composed of 19.2% acrylic acid, 28% propylene and 53% ethylene were blended with 46 g. of a liquid diglycidyl ether of bisphenol A.

---

This invention relates to compositions containing copolymers of ethylene. Further it relates to compositions comprising mixtures of (a) copolymers of ethylene, and (b) organic materials containing a multiplicity of epoxide groups and to a process for obtaining such products.

The prior polyolefin art deals with high molecular weight solid polymers which are fabricated by various molding procedures at high temperatures, i.e. 200° F. or higher. The prior liquid thermosetting casting resin art deals mainly with unsaturated polyesters which are dissolved in ethylenically unsaturated monomers such as styrene or with liquid epoxy resins. Polyester casting resins have the disadvantages of brittleness, high shrinkage during cure, flammability of the hydrocarbon monomer mixed therewith and they have a specific gravity greater than 1.0. Liquid epoxy resins have lower shrinkage and less hazard from fire than polyester compositions but present health hazards due at least in part to the highly toxic amines with which they are cured. The epoxy resins also have a specific gravity greater than 1.0.

It is an object of this invention to provide novel compositions of matter which are useful for preparing shaped articles. It is a further object to provide new compositions which are useful in the casting resin art. Yet a further object is to provide a composition which can be poured into molds at relatively low temperatures and which can then be converted to solid materials which are solvent resistant and possess chemical and electrical stability. It is yet another object to provide compositions in which fillers, pigments and other formulating ingredients can be dispersed at ambient or slightly elevated temperatures without need for the hot-compounding equipment which is required for conventional solid polyolefin molding pellets. A still further object is to provide a liquid casting resin which can be cured to a water-resistant, solvent-resistant, flexible solid.

We have discovered that these and other objects are attained by blending a low molecular weight copolymer of ethylene having reactive carboxyl groups with a low viscosity polyepoxide. The blend is poured into a mold of a desired shape and converted by heating (possibly after adding a catalyst) to a high molecular weight, water resistant, solvent resistant, flexible, chemically and electrically stable composition.

The ethylene copolymer component for use in the practice of this invention is obtained by polymerizing ethylene, an alpha-olefin having from 3 to 18 carbon atoms, and a polymerizable, ethylenically unsaturated monomer having at least one carboxyl group, i.e. —COOH, to form a copolymer having a molecular weight of from about 500 to about 10,000 and a viscosity from about 10,000 centipoises to about 1,000,000 centipoises. More particularly, the ethylene copolymer component is a copolymer of from about 2 percent to about 30 percent, preferably from about 5 percent to about 30 percent, by weight of an alpha-olefin having from 3 to 18 carbon atoms (hereinafter called the alpha-olefin); from about 5 percent to about 30 percent, preferably from about 10 percent to about 25 percent, by weight of an ethylenically unsaturated monomer having at least one carboxyl group (hereinafter called the carboxyl-containing monomer) and the balance, i.e. from about 40 percent to about 93 percent, preferably from about 45 percent to about 85 percent, of ethylene. The copolymers are prepared by polymerizing mixtures of the corresponding monomers. The polymerization may be carried out either in tubular or autoclave reactors at pressures from about 10,000 to 35,000 pounds per square inch, or higher, and at temperatures from about 130° C. to about 300° C. using, at catalytically effective concentration, polymerization catalysts such as peroxygen-type catalysts or other free-radical producing materials such as the azo catalysts and others well known in the art. Examples of the peroxygen-type catalysts are diethyl peroxide, hydrogen peroxide, di-tertiary butyl peroxide, persuccinic acid, lauroyl hydroperoxide, tetrahydronaphthalene peroxide, alkali metal, alkaline earth metal or ammonium persulfates, perborates, percarbonates, and the like. Such catalysts usually are used in the range from about 0.01 percent to about 1 percent, based on the weight of the monomers. Other methods of catalysis; such as irradiation by ultraviolet, X-ray and gamma rays as well as by radiation from radioactive materials and high energy electrons generated from linear accelerators, resonant transformers, and the like; may be used if desired. The term "under the influence of free-radical producing means" is defined to include free-radical producing materials as defined above in contact (e.g., either as solid particles or in solution) with the polymerizable monomer mixture and to irradiation as herein described, which produce free-radicals in effective concentration within the polymerization zone.

The upper limit of pressure is determined by the mechanical strength of the reactor and the pumps. Higher pressure effects higher molecular weight and higher conversions whereas higher temperature produces lower molecular weights and viscosities. The polymerization is carried out either in the presence or absence of water and/or inert solvents. For a particular molecular weight of copolymer within the range hereinabove described, an increase in the carboxyl-containing monomer proportion causes an increase in viscosity whereas an increase in the alpha-olefin proportion causes a decrease in viscosity. For given reaction conditions, an increase in the alpha-olefin proportion decreases the conversion and increases the catalyst requirements and the cost per unit of product. For a given alpha-olefin proportion and a given carboxyl-containing monomer proportion when the molecular weight or viscosity drops below the minimums described above, the products have poorer thermosetting properties.

If the alpha-olefin component is present in such quantities in the monomer mixture that when the mixture is polymerized, at least about 2 percent of the alpha-olefin, based on the total polymer weight, is copolymerized with ethylene and the carboxyl-containing monomer within the composition limits heretofore described, then optionally chain terminators containing up to about 8 carbon atoms and having no ethylenic unsaturation may be employed in the practice of this invention as aids in obtaining ethylene copolymers having a viscosity less than about $1 \times 10^6$ centipoises. Such chain terminators having no ethylenic unsaturation are represented by the saturated lower aliphatic ketones and the saturated lower alkanols, e.g., acetone, methyl ethyl ketone, dipropyl ketone, methyl isopropyl ketone, methyl n-hexyl ketone, ethyl propyl ketone, methanol, ethanol, propanol, isopropanol, n-butanol, isobutanol, sec. butanol, pentanol, hexanol, octanol, and the like.

As will be appreciated by those skilled in the art when provided with the teaching of this specification, compositions and conditions are selected from the operable ranges herein described to produce an ethylene copolymer having a viscosity less than $1 \times 10^6$ centipoises at 25° C. (77° F.). For instance, if the alpha-olefin component in the composition is predetermined to be about the minimum, i.e., about 2 percent of the total polymer weight, then a pressure at the lower end of the described range, and/or a greater proportion of the carboxyl-containing monomer usually is employed, chain terminators having no ethylenic unsaturation are helpful and temperatures at the upper end of the range are used. On the contrary, when the alpha-olefin component amount is near the upper end of the range, then higher pressures and lower temperatures are used and chain terminators having no ethylenic unsaturation are not in the monomer mixture, or if included are used in lower amounts. Higher amounts of catalyst also effect lower molecular weights and viscosities. Thus by selecting the monomers within the limits described herein, and suitably selecting the polymerization conditions, a copolymer product having a viscosity less than about $1 \times 10^6$ centipoises is obtained.

The prescribed proportion of the carboxyl-containing monomer, in addition to the cooperation and interaction with the alpha-olefin component in affecting the molecular weight and viscosity of the copolymer, also provides the functional groups, i.e., the reactive groups on the copolymer whereby the ethylene copolymer reacts with the epoxide groups of the polyepoxide in the blend as hereinafter described during the curing of the advantageous casting resin of this invention.

The alpha olefins, having from 3 to 18 carbon atoms which are copolymerized with ethylene and a carboxyl-containing monomer to provide the ethylene copolymer component are represented by propylene, 1-butene, isobutylene, 1-pentene, 1-hexene, 1-octene, 3-methyl-1-butene, 4-methyl-1-pentene, 1-octadecene, and the like, propylene is preferred.

The polymerizable, ethylenically unsaturated monomers having at least one carboxyl group are represented by the ethylenically unsaturated monocarboxylic acids, such as acrylic acid, methacrylic acid, crotonic acid, tiglic acid, angelic acid and cinnamic acid; the ethylenically unsaturated dicarboxylic acids, such as fumaric acid, itaconic acid, maleic acid, citraconic acid, and mesaconic acid; ethylenically unsaturated tricarboxylic acids, such as aconitic acid, and the esters of polycarboxylic acids having at least one carboxyl group which is not esterified such as tripropylene glycol ether acid maleate and ethylene glycol phenyl ether acid maleate.

The polyepoxides useful in the practice of this invention are relatively low molecular weight organic materials having a multiplicity of epoxide groups and which have a viscosity less than about 100,000 centipoises at 200° F. but preferably less than about 100,000 centipoises at 77° F.

Representative examples of such polyepoxides are diglycidyl ether of bisphenol A and low molecular weight resins thereof, dipropylene glycol diglycidyl ether, polyglycol diepoxides, low molecular weight epoxy novolac resins, soybean oil polyepoxide, butadiene dioxide, vinyl cyclohexene dioxide, and the like. Methods of preparation of such polyepoxides are known to the art, such as by the reaction of epichlorohydrin and polyhydric phenols. For example, methods of preparation of diglycidyl ether of bisphenol A and steps adaptable to obtain high monomeric yields are discussed by Henry Lee and Kris Neville in "Epoxy Resins," McGraw Hill Publishing Co., Inc. N.Y., 1957, pages 7–12. Low viscosity polyepoxides also are prepared from organic compounds containing two or more sites of ethylenic unsaturation by oxidative procedures with such agents as peracetic acid, perbenzoic acid, or oxygen and selective metal catalysts.

The ethylene copolymer and the polyepoxide, optionally with formulating ingredients, are blended then cured. The curing step primarily is a reaction of the epoxide groups of the polyepoxide with the carboxyl groups on the ethylene copolymer. Usually a catalyst is added to speed the reaction although the curing step may be caused to occur by heating the mixture. A combination of elevated temperature such as greater than about 50° C. and an accelerator also is utilized. The ethylene copolymer and the polyepoxide are selected so that the blend, before curing, has a viscosity less than about 100,000 centipoises at 200° F. and preferably less than about 100,00 centipoises at 77° F. Ordinarily the polyepoxide contemplated for blending with the ethylene copolymer has a viscosity less than 100,000 centipoises at 200° F. and as low as about 8 centipoises or lower at 68° F. Reactive diluents which are rendered non-volatile in the curing step, e.g. butyl glycidyl ether and phenyl glycidyl ether may be used to reduce the viscosity if desired. While for some purposes volatile diluents, i.e. solvents, may be used as viscosity reducers, in the preferred embodiments of this invention only diluents which are insoluble after the curing step are used—when required. Liquid epoxy novolac resins within the viscosity ranges outlined above may be used as the polyepoxide component as well as blends of epoxy novolac resins of somewhat higher viscosity with polyepoxides of low viscosity such as vinylcyclohexene dioxide (which has a viscosity of about 8 centipoises at 68° F.). Thus the term "a polyepoxide having a viscosity less than about 100,000 centipoises at 200° F." includes mixtures of polyepoxides such that the resulting blend of polyepoxides has a viscosity within such limits although one of the polyepoxide components of the blend may, by itself, have a higher viscosity. If ethylene copolymers having a viscosity somewhat greater than 100,000 centipoises at 200° F. are used, then the polyepoxide component must be selected from those polyepoxides having viscosities in the lower portion of the overall operable range in order that the blend of polyepoxide and copolymer does not exceed the upper limit of about 100,000 centipoises at 200° F. With the lower viscosity copolymers, the full range of polyepoxides as described herein may be used.

The polyepoxides are blended with the ethylene copolymers by usual mixing procedures in such proportions that for each reactive group on the ethylene copolymer there are from about 0.5 to about 2.0 epoxide groups, preferably from about 0.8 to about 1.2 epoxide groups, in the polyepoxide component.

When a curing accelerator is used the amount usually ranges from about 0.25 percent to about 3.0 percent and often is from 0.5 percent to 1.0 percent, based on the weight of the blend of copolymer and polyepoxide in the composition. Such curing accelerators are amino compounds, especially the tertiary amines; e.g., benzyldimethylamine, 2,4,6 - tri(dimethylaminomethyl) - phenol and other common tertiary amines and their salts; boron trifluoride-amine complexes, amine borates, and other compounds used to promote the curing of epoxy resins but which do not themselves serve as direct cross-linking agents.

The following examples are provided to illustrate to those skilled in the art the practice of this invention but should not be construed as limiting the invention thereto.

*Example 1*

Ethylene at a rate of 13.2 pounds per hour, propylene at the rate of 24 pounds per hour and acrylic acid at the rate of 1.08 pounds per hour (as a 75 percent solution of the acid in acetone) were pumped into a stirred autoclave at a pressure of 15,000 pounds per square inch at the reaction temperature of 225° C. Concurrently the catalyst, di-tertiarybutyl peroxide, was introduced at the rate of 0.047 pound per hour. The product obtained thereby had the following properties:

| | Percent by weight |
|---|---|
| Interpolymerized acrylic acid content | 19.2 |
| Interpolymerized propylene content | About 28 |
| Interpolymerized ethylene content | About 53 |

Viscosity at 25° C. (77° F.), 310,000 centipoises.
Molecular weight, 2,500.

A 100-gram portion of the liquid ethylene copolymer was warmed to 150° F. to facilitate mixing. With the resulting warm liquid was blended by stirring 46 grams of liquid diglycidyl ether of bisphenol A. With the resulting warm opaque blend was mixed 0.7 gram (0.5 percent by weight) of 2,4,6-tri(dimethylaminomethyl)phenol. A portion of the uncured mixture obtained thereby was poured into a glass test tube which had previously been treated with a silicone release agent. Curing was then accomplished by heating the test tube and contents in an oven for 16 hours at 180° F. then 1 hour at 350° F. When the temperature of cured material had been reduced to about 75° F. the glass was broken away leaving a cured rod-shaped casting. The cured casting was stiff, hazy and had a Shore A–2 hardness rating of 70 on initial indentation, and a rating of 42 after a 15-second indentation (ASTM D676–55T). Within one hour after the hardness pin was withdrawn, recovery from the indentation was complete. A portion of this casting was placed in water where it floated on the surface. After the water had been boiled for two hours, the sample was withdrawn and dried for 16 hours at 75° F. No change in properties of the thus-treated portion could be detected. A portion of the casting when placed on a hot plate at 500° F. for one minute did not melt but softened and charred slightly. The cured composition was insoluble in hexane, xylene, or methyl ethyl ketone. A portion of the blend which had been isolated before the curing step was kept at 75° F. to check the aging properties. After 10 days the blend was still liquid.

*Example 2*

Another resin composition was prepared in the same manner as in Example 1 except that 18.6 parts of vinylcyclohexene dioxide per 100 parts of ethylene copolymer was substituted for the liquid diglycidyl ether of bisphenol-A. The resulting resin composition was clear, flexible and had a Shore A–2 hardness rating of 60 on initial indentation and a rating of 20 after a 15 second indentation. As with the product of Example 1 recovery from the indentation was complete. The cured resin composition was insoluble in hexane, xylene, or methyl ethyl ketone. Also as in Example 1, the portion of the mixture not submitted to the curing step was still liquid after 10 days at 75° F.

*Example 3*

A liquid ethylene copolymer was prepared as in Example 1 with the following changes.

| | |
|---|---|
| Ethylene feed rate lbs./hr | 20 |
| Propylene feed rate lbs./hr | 16 |
| Acrylic acid feed rate lbs./hr | 1.31 |
| Catalyst feed rate lbs./hr | 0.094 |
| Temperature of polymerization, 215° C. | |

The ethylene copolymer obtained thereby had the following properties:

| | Percent by weight |
|---|---|
| Interpolymerized acrylic acid content | 15.6 |
| Interpolymerized proylene content | About 18 |
| Interpolymerized ethylene content | About 66 |

Viscosity at 25° C., 319,500 cps.
Molecular weight, 2,200.

A portion of the liquid ethylene copolymer was blended with vinyl cyclohexene diepoxide in the ratio of 15 parts of the diepoxide per 100 parts of the ethylene copolymer. With the resulting blend was mixed 0.5 percent by weight, based on the weight of blend, of 2,4,6-tri-(dimethylaminomethyl)phenol. Forty grams of the resulting mixture was held at about 200° F. while a previously prepared filler mixture consisting of 41 grams of calcium carbonate, 13.5 grams of Ottawa sand and 5 grams of titanium dioxide was mixed thoroughly therein by stirring. The thus-prepared casting composition was poured into a Teflon-lined steel mold which was then kept at 270° F. for 5½ hours then cooled. The resulting white, cast sheet had a Shore A–2 hardness of 78 initial and 55 after 15 seconds. Recovery was complete.

The acrylic acid content of the products of these examples was determined by titration with alcoholic KOH and confirmed by infra red analysis based on standards which were determined by oxygen analysis. There may be substituted for the propylene of these examples other alpha-olefins having from 3 to 18 carbon atoms with substantially the same results. Similiarly other polyepoxides having a viscosity less than 100,000 centipoises at 200° F., such as dipropylene glycol diglycidyl ether, polyglycol diepoxides, low molecular weight epoxy novolac resins, soybean oil polyepoxide, and butadiene dioxide, or mixtures of polyepoxides having such viscosity, may be substituted for the diglycidyl ether of bisphenol A or the vinylcyclohexene dioxide of the above examples with substantially the same results if the teachings elsewhere in these specifications as to the viscosity of the blend of polyepoxide and copolymer are adhered to.

The products of this invention find usefulness as casting syrups for encapsulating motor windings, coils and transformers. Subsequent curing of these syrups provides the required coatings which are not water sensitive. Their utilization as binders for floor tile or related plastics which require very high filler loads allows use of the casting process with advantageous results.

What is claimed is:

1. A composition of matter comprising a low molecular weight liquid copolymer of:
   (a) from about 40 to about 93 percent by weight of ethylene
   (b) from about 2 to about 30 percent by weight of an alpha mono-unsaturated aliphatic olefin having from 3 to 18 carbon atoms and
   (c) from about 5 to about 30 percent by weight of a polymerizable, ethylenically unsaturated monomer having a carboxyl group, all percentages being based on the total weight of the polymer, said copolymer having a molecular weight of from about 500 to about 10,000 and a viscosity of less than about $1 \times 10^6$ centipoises at 77° F.

2. A composition of matter comprising a low molecular weight liquid copolymer of:
   (a) from about 45 to about 85 percent by weight of ethylene
   (b) from about 5 to about 30 percent by weight of an alpha mono-unsaturated aliphatic olefin having from 3 to 18 carbon atoms and
   (c) from about 10 to about 25 percent by weight of a polymerizable, ethylenically unsaturated monomer having at least one carboxyl group, all percentages being based on the total weight of the polymer, said copolymer having a molecular weight of from about 500 to about 10,000 and a viscosity less than about 1×10⁶ centipoises at 77° F.

3. The composition of claim 2 in which the alpha mono-unsaturated aliphatic olefin is propylene.

4. The composition of claim 2 wherein the polymerizable, ethylenically unsaturated monomer having a carboxyl group is acrylic acid.

5. A casting composition comprising a blend of
   (1) a low molecular weight liquid copolymer of
       (a) from about 40 to about 93 percent by weight of ethylene
       (b) from about 2 to about 30 percent by weight of an alpha mono-unsaturated aliphatic olefin having from 3 to 18 carbon atoms and
       (c) from about 5 to about 30 percent by weight of a polymerizable, ethylenically unsaturated monomer having a carboxyl group, said copolymer having a molecular weight of from about 500 to about 10,000 and a viscosity less than about 1×10⁶ centipoises at 77° F., and
   (2) a polyepoxide having a multiplicity of epoxide groups and a viscosity less than about 100,000 centipoises at 200° F., in proportion of from about 0.5 to about 2.0 epoxide groups per carboxyl group in the copolymer.

6. The composition of claim 5 in which the copolymer is a copolymer of ethylene, propylene and acrylic acid.

7. The composition of claim 5 in which the polyepoxide is diglycidyl ether of bisphenol-A.

8. The composition of claim 5 in which the polyepoxide is vinyl cyclohexene diepoxide.

9. A cured composition comprising the reaction product of
   (1) a low molecular weight liquid copolymer of
       (a) from about 40 to about 93 percent by weight of ethylene
       (b) from about 2 to about 30 percent by weight of an alpha mono-unsaturated aliphatic olefin having from 3 to 18 carbon atoms and
       (c) from about 5 to about 30 percent by weight of a polymerizable, ethylenically unsaturated monomer having a carboxyl group, said copolymer having a molecular weight of from about 500 to about 10,000 and a viscosity less than about 1×10⁶ centipoises at 77° F., and
   (2) a polyepoxide having a multiplicity of epoxide groups and a viscosity less than about 1×10⁵ centiposies at 200° F., in proportion of from about 0.5 to about 2.0 epoxide groups per carboxyl group in the copolymer.

10. The cured composition of claim 9 in which the alpha mono-unsaturated aliphatic olefin is copolymerized in the ethylene copolymer in an amount from about 5 percent to about 30 percent by weight, based on the total copolymer weight.

11. The cured composition of claim 9 in which the polymerizable, ethylenically unsaturated monomer having a carboxyl group is copolymerized in the ethylene copolymer in an amount from about 10 percent to about 25 percent by weight, based on the total copolymer weight.

12. The cured composition of claim 9 in which the polyepoxide is diglycidyl ether of bisphenol-A.

13. The cured composition of claim 9 in which the polyepoxide is vinyl cyclohexene dioxide.

14. The cured composition of claim 10 in which the alpha mono-unsaturated aliphatic olefin is propylene.

15. The cured composition of claim 11 in which the polymerizable, ethylenically unsaturated monomer having a carboxyl group is acrylic acid.

16. A process for producing a homogeneous, low molecular weight liquid copolymer having a molecular weight of from about 500 to about 10,000 and a viscosity less than about 1×10⁶ centipoises at 77° F. which process comprises heating at a temperature of from about 130° C. to about 300° C. under a pressure from about 10,000 to about 35,000 pounds per square inch and under the influence of free-radical producing means a monomer mixture comprising
   (a) ethylene
   (b) an alpha mono-unsaturated aliphatic olefin having from 3 to 18 carbon atoms and
   (c) a polymerizable, ethylenically unsaturated monomer having a carboxyl group.

17. A method of curing an ethylene copolymer composition comprising
   (A) blending
       (1) a low molecular weight liquid copolymer of
           (a) from about 40 to about 93 percent by by weight of ethylene
           (b) from about 2 to about 30 percent by weight of an alpha mono-unsaturated aliphatic olefin having from 3 to 18 carbon atoms and
           (c) from about 5 to about 30 percent by weight of a polymerizable, ethylenically unsaturated monomer having a carboxyl group, said copolymer having a molecular weight of from about 500 to about 10,000 and a viscosity less than about 1×10⁶ centipoises at 77° F., and
       (2) a polyepoxide having a multiplicity of epoxide groups and a viscosity less than about 1×10⁵ centipoises at 200° F., in proportion of from about 0.5 to about 2.0 epoxide groups per carboxyl group in the copolymer,
   (B) heating the resulting blend at a temperature greater than about 50° C. for a time sufficient that a chemical reaction occurs between at least a portion of the carboxyl groups in the copolymer and the epoxy groups in the polyepoxide.

References Cited
UNITED STATES PATENTS

| | | | |
|---|---|---|---|
| 3,249,570 | 5/1966 | Potts | 260—80.5 |
| 3,278,495 | 10/1966 | Hagel | 260—78.5 |
| 2,396,785 | 3/1946 | Hanford | 260—78.5 |

GEORGE F. LESMES, *Primary Examiner.*

MURRAY TILLMAN, *Examiner.*

P. LIEBERMAN, *Assistant Examiner.*